United States Patent
Zhao

(10) Patent No.: US 8,237,395 B2
(45) Date of Patent: Aug. 7, 2012

(54) DUAL-SPEED SINGLE-PHASE AC MOTOR

(75) Inventor: Yong Zhao, Zhongshan (CN)

(73) Assignee: Zhongshan Broad-Ocean Motor Manufacturing Co., Ltd., Zhongshan (CN)

( * ) Notice: Subject to any disclaimer, the term of this patent is extended or adjusted under 35 U.S.C. 154(b) by 0 days.

(21) Appl. No.: 13/299,312

(22) Filed: Nov. 17, 2011

(65) Prior Publication Data
US 2012/0062165 A1 Mar. 15, 2012

Related U.S. Application Data

(63) Continuation of application No. PCT/CN2010/070391, filed on Feb. 1, 2010.

(51) Int. Cl.
*H02P 1/42* (2006.01)

(52) U.S. Cl. ........ 318/786; 318/704; 318/812; 318/787; 318/139; 310/184; 310/156.12; 417/22; 388/811

(58) Field of Classification Search ............. 318/704, 318/775, 786, 774, 778, 779, 785, 787, 430; 700/295; 307/64
See application file for complete search history.

(56) References Cited

U.S. PATENT DOCUMENTS 4,862,053 A * 8/1989 Jordan et al. ........... 318/786
5,689,168 A * 11/1997 Bogwicz et al. ......... 318/772

* cited by examiner

*Primary Examiner* — Walter Benson
*Assistant Examiner* — Jorge Carrasquillo
(74) *Attorney, Agent, or Firm* — Matthias Scholl P.C.; Matthias Scholl

(57) ABSTRACT

A dual-speed single-phase AC motor, including: a stator, including a stator core, and a coil winding, including a starting winding, a first main winding, and a second main winding, a rotor, and a starting circuit, including a rectifying and voltage-stabilizing circuit, a detecting circuit, a voltage comparison circuit, a first switching circuit, a second switching circuit, and a third switching circuit. The number of poles of the starting winding is the same as that of the first main winding. The number of poles of the first main winding is less than that of the second main winding.

7 Claims, 3 Drawing Sheets

DUAL-SPEED SINGLE-PHASE AC MOTOR

CROSS-REFERENCE TO RELATED APPLICATIONS

This application is a continuation of International Patent Application No. PCT/CN2010/070391 with an international filing date of Feb. 1, 2010, designating the United States, now pending, and further claims priority benefits to Chinese Patent Application No. 200920058443.0 filed on Jun. 9, 2009. The contents of all of the aforementioned applications, including any intervening amendments thereto, are incorporated herein by reference.

BACKGROUND OF THE INVENTION

1. Field of the Invention

The invention relates to a dual-speed single-phase AC motor.

2. Description of the Related Art

Nowadays, single-phase AC motors are widely used, among which approximately 20% operate at rated speed, and above 80% operate after varying speed. Most single-phase AC motors adjust speed by reducing voltage, for example, by tap of winding, connection of reactance and so on. Relationship between voltage and power is $P=U^2/R$, R is a constant, and the power is proportional to the square of voltage. All these methods implement adjustment of speed by reducing input voltage. As a range of adjusting speed is comparatively wide, adjustment of output power is difficult to be implemented. In other words, adjustment of speed via variation of output power features comparatively narrow adjustment range, which makes it difficult to meet requirement for loads, and for various application of uses.

Although pole-changing adjustable-speed single-phase AC motors appear recently, they use mechanical centrifugal switches to implement switching and control functions, the mechanical centrifugal switches are opened under the action of centrifugal force, and switch off starting circuits and operate. During on/off of the mechanical centrifugal switches, electric arc spark is generated, which reduces work life thereof. Moreover, starting circuits thereof feature poor controllability and low control accuracy, and motors using the same have low operation reliability.

SUMMARY OF THE INVENTION

In view of the above-described problem, it is an objective of the invention to provide a dual-speed single-phase AC motor that is capable of implementing automatic pole-changing and adjustable-speed control, accurate control, and convenient operation, and ensuring stable and reliable operation of motors using the same.

To achieve the above objectives, in accordance with one embodiment of the invention, provided is a dual-speed single-phase AC motor, comprising: a stator, comprising a stator core, and a coil winding, comprising a starting winding, a first main winding, and a second main winding, a rotor, and a starting circuit, comprising a rectifying and voltage-stabilizing circuit, a detecting circuit, a voltage comparison circuit, a first switching circuit, a second switching circuit, and a third switching circuit, the number of poles of the starting winding is the same as that of the first main winding, the number of poles of the first main winding is less than that of the second main winding, during low-speed starting, the first switching circuit is serially connected to the first main winding, and then to a utility AC power supply, the second switching circuit is serially connected to the second main winding, and then to the utility AC power supply, the third switching circuit is serially connected to the starting winding, and a starting capacitor, and then to the utility AC power supply, a signal input end of each of the first switching circuit, the second switching circuit, and the third switching circuit is connected to an output end of the voltage comparison circuit, another signal input end thereof is connected to the ground, or to an output end of the rectifying and voltage-stabilizing circuit, and the first switching circuit, the third switching circuit, and the second switching circuit form an interlocking relationship, as the first switching circuit and the third switching circuit are closed, the second switching circuit is opened, the first main winding and the starting winding are energized and operate, and the second main winding stops operating, and as the first switching circuit and the third switching circuit are opened, the second switching circuit is closed, the first main winding and the starting winding are de-energized and stop operating, and the second main winding is energized and operates.

In a class of this embodiment, during high-speed operation, a linked switch is used to switch off the first switching circuit and the second switching circuit, and switches and connection relationship are used so that the first main winding is connected to the utility AC power supply, and the third switching circuit is serially connected to the starting winding and the starting capacitor, and then to the utility AC power supply.

In a class of this embodiment, the first switching circuit, the second switching circuit, and the third switching circuit mainly comprise photoelectric couplers, and bidirectional triode thyristors.

In a class of this embodiment, an output end of the rectifying and voltage-stabilizing circuit is connected to a utility power AC input, an output end of the rectifying and voltage-stabilizing circuit provides a low-voltage DC power supply for the detecting circuit, and the voltage comparison circuit, the detecting circuit detects an electric signal of the motor main winding, and inputs the electric signal to the voltage comparison circuit for processing, and the voltage comparison circuit output end controls the first switching circuit, the second switching circuit, and the third switching circuit.

In a class of this embodiment, the voltage comparison circuit is a hysteresis comparison circuit.

In a class of this embodiment, the number of poles of each of the starting winding and the first main winding is 4, and the number of poles of the second main winding is 6.

In a class of this embodiment, as the motor operates at low speed, firstly an operating circuit for the 4-pole starting winding, and that for the 4-pole main winding are switched on, the motor is started in a 4-pole starting mode, upon reaching certain speed, the operating circuit for the 4-pole starting winding, and that for the 4-pole main winding are switched off, an operating circuit for the 6-pole main winding is switched on and control the motor to operate.

Advantages of the invention comprise: 1) it has an independent 4-pole first main winding, a 6-pole second main winding, and a 4-pole starting winding, during low-speed starting, the 4-pole first main winding and the 4-pole starting winding are firstly started, upon reaching a certain speed, they are switched to the 6-pole second main winding for operation, and adjustment of speed is automatically controlled, which features accurate control, and convenient operation, and operation of motors using the same is stable and reliable; 2) the bidirectional triode thyristor replaces a conventional mechanical centrifugal switch, no electric arc spark is generated during on/off thereof, which makes the invention safe and reliable, and increases work life thereof; 3) a pole-changing adjustable-speed method is used to control the motor according to a relationship n=60f/p*(1−s) (in which n is rotating speed, f is frequency, p is the number of poles, and s is slip rate), f and s are constants, as p is larger, n is smaller, there is no need to reduce input voltage, affect of power variation is small, no additional slip loss exists, and adjustment of speed is convenient and high-efficient, which make the invention meet requirement for loads, and for practical application of users.

DETAILED DESCRIPTION OF THE EMBODIMENTS

Further description of the invention will be given below in conjunction with specific embodiments and accompanying drawings.

Figure 1:
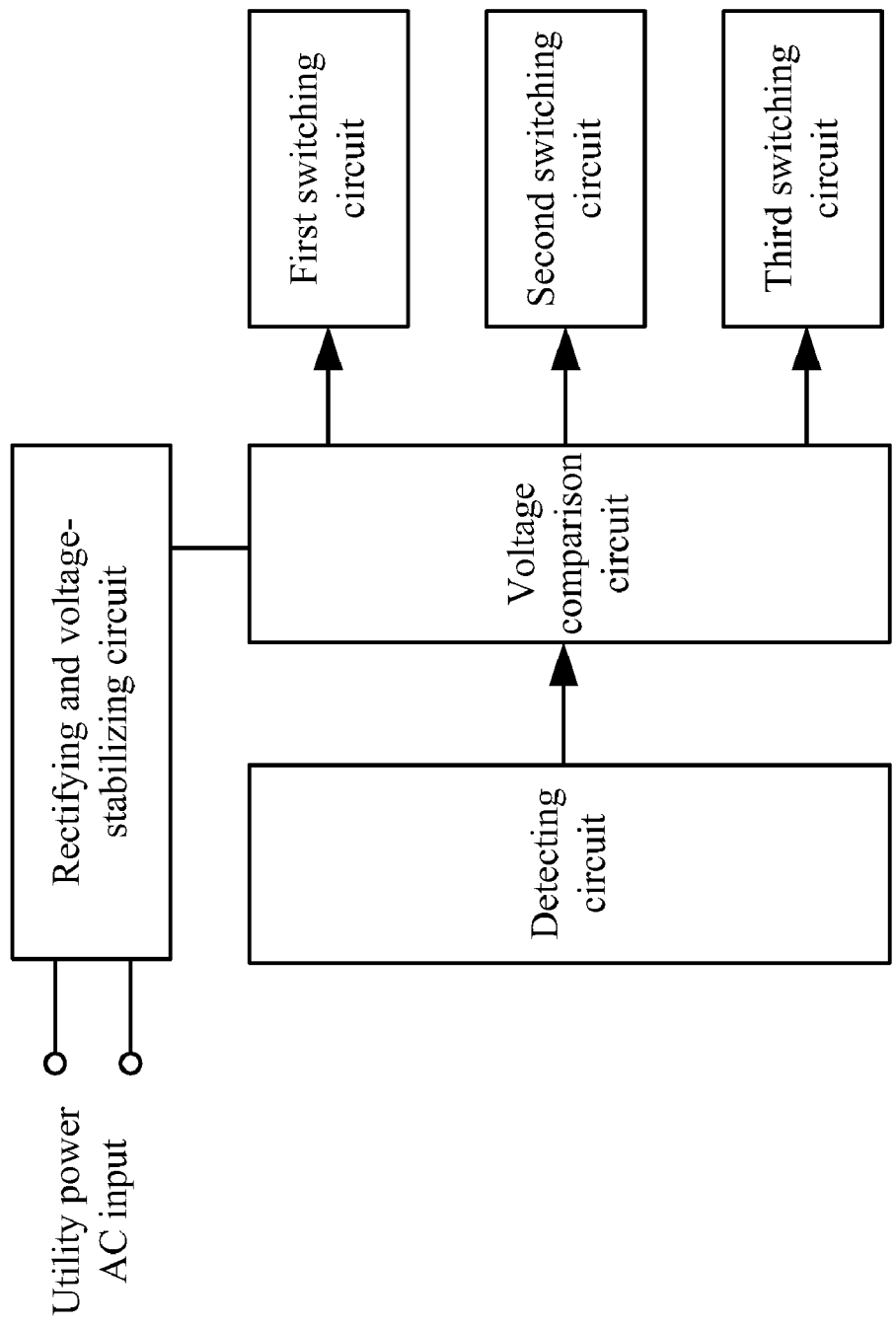
FIG. 1 is a block diagram of a dual-speed single-phase AC motor of an exemplary embodiment of the invention.
Figure 2:
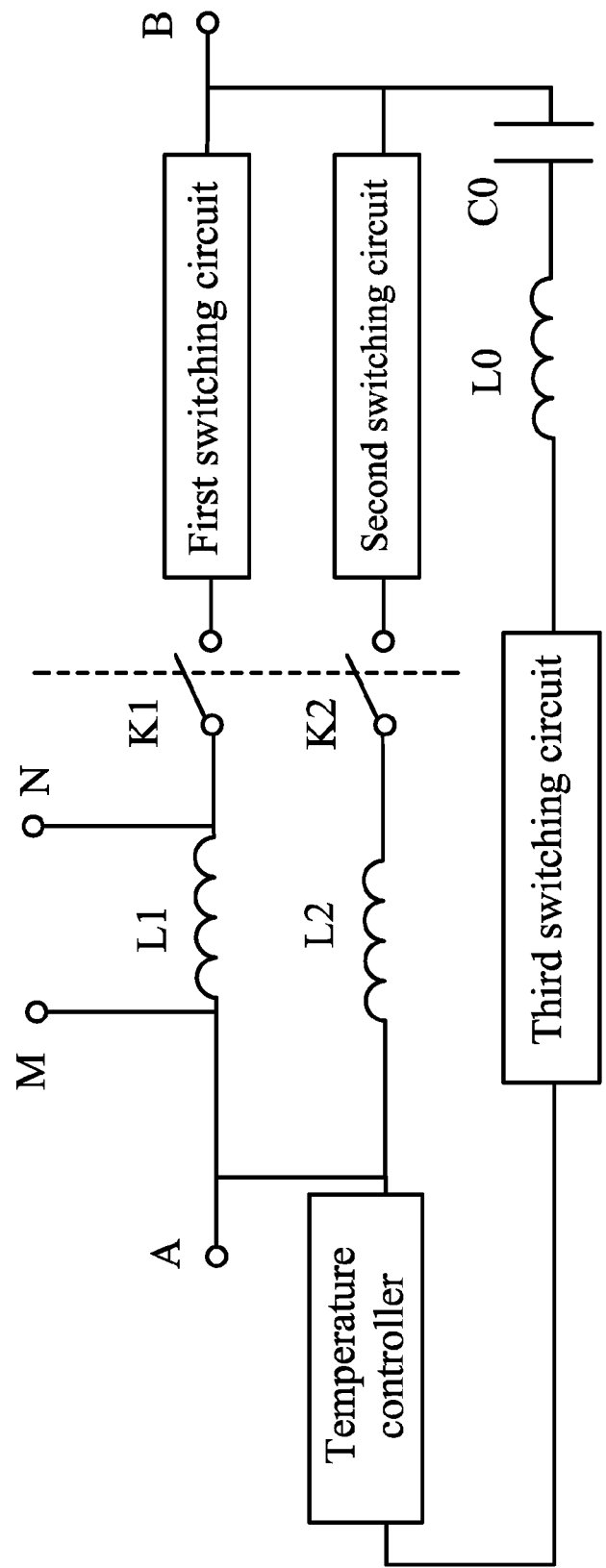
FIG. 2 illustrates control process of the invention.
Figure 3:
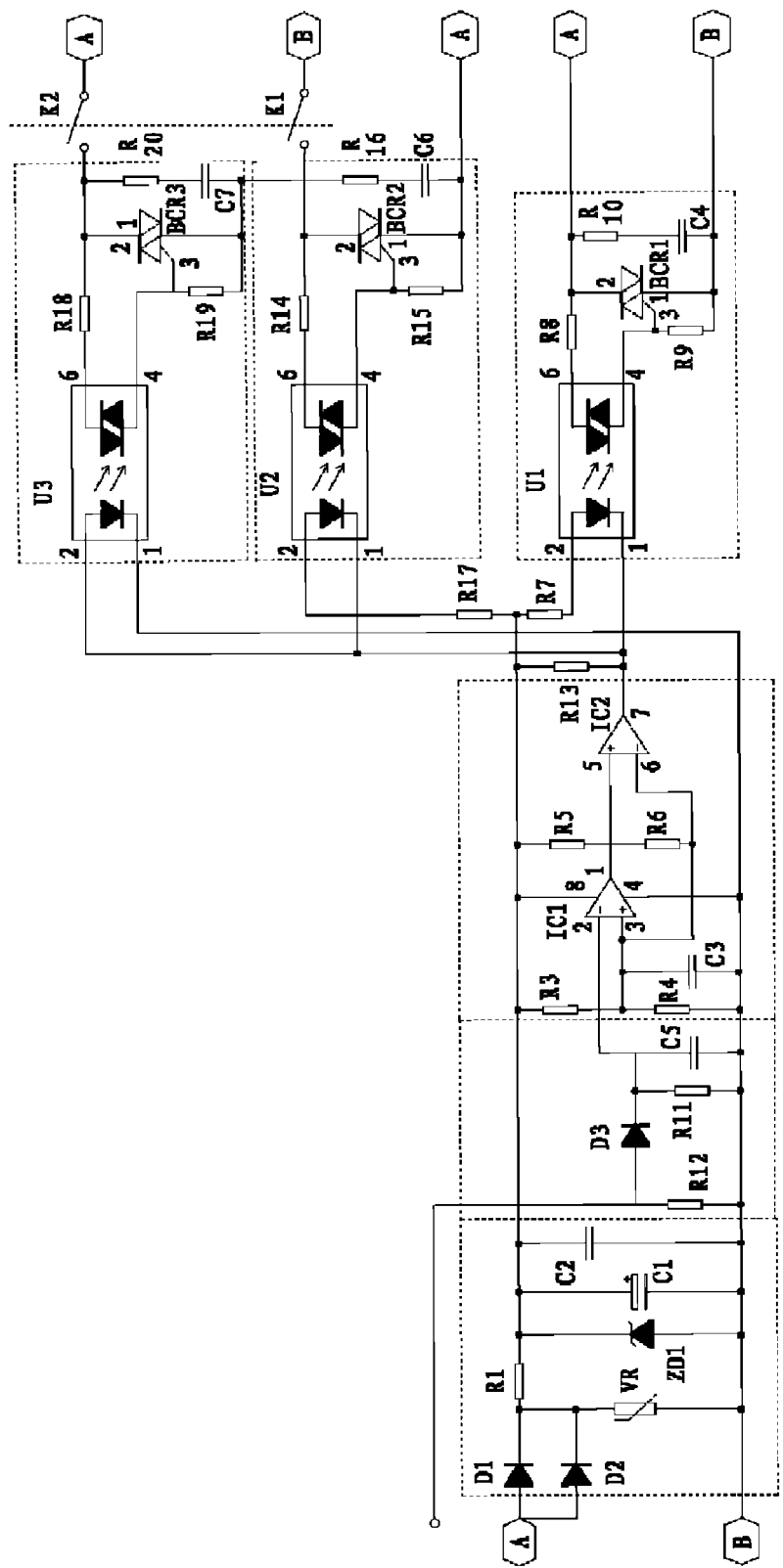
FIG. 3 is a circuit diagram of a dual-speed single-phase AC motor of an exemplary embodiment of the invention.

As shown in FIGS. 1, 2, and 3, a dual-speed single-phase AC motor of the invention comprises: a stator, a rotor, and a starting circuit.

The stator comprises a stator core, and a coil winding, and the coil winding comprises a starting winding L0, a first main winding L1, and a second main winding L2.

The starting circuit comprises a rectifying and voltage-stabilizing circuit, a detecting circuit, a voltage comparison circuit, a first switching circuit, a second switching circuit, and a third switching circuit.

The number of poles of the starting winding L0 is the same as that of the first main winding L1, the number of poles of the first main winding L1 is less than that of the second main winding L2.

During low-speed starting, the first switching circuit is serially connected to the first main winding L1, and then to a utility AC power supply, the second switching circuit is serially connected to the second main winding L2, and then to the utility AC power supply, the third switching circuit is serially connected to the starting winding L0, and a starting capacitor C0, and then to the utility AC power supply, a signal input end of each of the first switching circuit, the second switching circuit, and the third switching circuit is connected to an output end of the voltage comparison circuit, another signal input end thereof is connected to the ground, or to an output end of the rectifying and voltage-stabilizing circuit, and the first switching circuit, the third switching circuit, and the second switching circuit form an interlocking relationship.

As the first switching circuit and the third switching circuit are closed, the second switching circuit is opened, the first main winding L1 and the starting winding L0 are energized and operate, and the second main winding L2 stops operating.

As the first switching circuit and the third switching circuit are opened, the second switching circuit is closed, the first main winding L1 and the starting winding L0 are de-energized and stop operating, and the second main winding L2 is energized and operates. During high-speed operation, linked switches K1 and K2 are used to switch off the first switching circuit and the second switching circuit, and switches and connection relationship are used so that both ends M and N of the first main winding L1 are connected to the utility AC power supply, and the third switching circuit is serially connected to the starting winding L0 and the starting capacitor C0, and then to the utility AC power supply.

The first switching circuit comprises a photoelectric coupler U2, and a bidirectional triode thyristor BCR2, the second switching circuit comprises a photoelectric coupler U3, and a bidirectional triode thyristor BCR3, and the third switching circuit comprises a photoelectric coupler U1, and a bidirectional triode thyristor BCR1.

An input end of the rectifying and voltage-stabilizing circuit is connected to a utility power AC input, an output end of the rectifying and voltage-stabilizing circuit provides a low-voltage DC power supply for the detecting circuit, and the voltage comparison circuit, the detecting circuit detects an electric signal of the motor main winding, and inputs the electric signal to the voltage comparison circuit for processing, and the voltage comparison circuit output end controls the first switching circuit, the second switching circuit, and the third switching circuit.

The voltage comparison circuit is a hysteresis comparison circuit.

The number of poles of each of the starting winding L0 and the first main winding L1 is 4, and the number of poles of the second main winding L2 is 6. As the motor operates at low speed, firstly an operating circuit for the 4-pole starting winding L0, and that for the 4-pole main winding are switched on, the motor is started in a 4-pole starting mode, upon reaching certain speed, the operating circuit for the 4-pole starting winding L0, and that for the 4-pole main winding are switched off, an operating circuit for the 6-pole main winding is switched on and control the motor to operate.

As shown in FIGS. 1-3, operation principle of the invention is: as the motor operates at high speed, the 4-pole starting winding L0 is started, both ends A and B of the operating circuit for the 4-pole starting winding are connected to the utility AC power supply, and the linked switches K1 and K2 are simultaneously switched off so that the operating circuit for the 6-pole main winding is switched off and stops operating. The utility AC power supply is connected between both ends M and N of the 4-pole main winding, the 4-pole main winding L1 is energized and operates, the detecting circuit detects a current signal of the 4-pole main winding L1 is large enough, and inputs the signal to the input end of the hysteresis comparison circuit. The output end of the hysteresis comparison circuit outputs low level, namely when input of pin 1 of each of the photoelectric couplers U1 and U2 is low level, input of pin 2 of the photoelectric couplers U3 is low level. At this time the photoelectric couplers U1 and U2 are on, the photoelectric coupler U3 is off. The photoelectric coupler U1 triggers and controls the bidirectional triode thyristor BCR1 to switch on the 4-pole starting winding L0, and the starting capacitor C0, and the photoelectric coupler U2 triggers and controls the bidirectional triode thyristor BCR2 to switch on the 4-pole main winding L1. At this time the operating circuit for the 6-pole main winding does not operate, the operating circuit for the 4-pole starting winding and that for the 4-pole main winding start the motor for operating. As rotating speed of the motor reaches 70-85% of synchronous speed, the operating circuit for the 4-pole starting winding is switched off, and the operating circuit for the 4-pole main winding controls the motor to operate.

As the motor operates at low speed, the operating circuit for the 4-pole starting winding is switched on, the linked switches K1 and K2 are switched on, and the 4-pole main winding L1 is switched on, and the utility AC power supply is connected between both ends A and B of the operating circuit for the 4-pole main winding. As the operating circuit for the 4-pole main winding is energized and operates, the detecting circuit detects the current signal of the 4-pole main winding L1 is large enough, and inputs the signal to the input end of the hysteresis comparison circuit. At this time, the output end of the hysteresis comparison circuit outputs low level, the photoelectric couplers U1 and U2 are on, and the photoelectric coupler U3 is off, the photoelectric coupler U1 triggers and controls the bidirectional triode thyristor BCR1 to switch on the 4-pole starting winding L0, and the starting capacitor C0, and the photoelectric coupler U2 triggers and controls the bidirectional triode thyristor BCR2 to switch on the 4-pole main winding L1, and the operating circuit for the 4-pole starting winding, and that for the 4-pole main winding. At this time the operating circuit for the 6-pole main winding does not operate. Then the 6-pole main winding L2 is switched on, and the utility AC power supply is connected between both ends A and B of the operating circuit for the 6-pole main winding. The output end of the hysteresis comparison circuit outputs high level, the photoelectric couplers U1 and U2 are off, and the photoelectric coupler U3 is on. The photoelectric coupler U3 triggers and controls the bidirectional triode thyristor BCR3 to switch on the 6-pole main winding L2. At this time the operating circuit for the 4-pole starting winding and the operating circuit for the 4-pole main winding stop operating, and the operating for the 6-pole main winding controls the motor to operate.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A dual-speed single-phase AC motor, comprising
   a stator, comprising
      a stator core; and
      a coil winding, comprising a starting winding, a first main winding, and a second main winding;
   a rotor,
   and a starting circuit, comprising a rectifying and voltage-stabilizing circuit, a detecting circuit, a voltage comparison circuit, a first switching circuit, a second switching circuit, and a third switching circuit;
   wherein
      the number of poles of said starting winding is the same as that of said first main winding;
      the number of poles of said first main winding is less than that of said second main winding;
      during low-speed starting, said first switching circuit is serially connected to said first main winding, and then to a utility AC power supply, said second switching circuit is serially connected to said second main winding, and then to said utility AC power supply, said third switching circuit is serially connected to said starting winding, and a starting capacitor, and then to said utility AC power supply, a signal input end of each of said first switching circuit, said second switching circuit, and said third switching circuit is connected to an output end of said voltage comparison circuit, another signal input end thereof is connected to the ground, or to an output end of said rectifying and voltage-stabilizing circuit,
      and said first switching circuit, said third switching circuit, and said second switching circuit form an interlocking relationship;
      as said first switching circuit and said third switching circuit are closed, said second switching circuit is opened, said first main winding and said starting winding are energized and operate, and said second main winding stops operating; and
      as said first switching circuit and said third switching circuit are opened, said second switching circuit is closed, said first main winding and said starting winding are de-energized and stop operating, and said second main winding is energized and operates.

2. The motor of claim 1, wherein during high-speed operation, a linked switch is used to switch off said first switching circuit and said second switching circuit, and switches and connection relationship are used so that said first main winding is connected to said utility AC power supply, and said third switching circuit is serially connected to said starting winding and said starting capacitor, and then to said utility AC power supply.

3. The motor of claim 1, wherein said first switching circuit, said second switching circuit, and said third switching circuit mainly comprise photoelectric couplers, and bidirectional triode thyristors.

4. The motor of claim 1, wherein
   an input end of said rectifying and voltage-stabilizing circuit is connected to a utility power AC input;
   an output end of said rectifying and voltage-stabilizing circuit provides a low-voltage DC power supply for said detecting circuit, and said voltage comparison circuit;
   said detecting circuit detects an electric signal of said motor main winding, and inputs said electric signal to said voltage comparison circuit for processing; and
   said voltage comparison circuit output end controls said first switching circuit, said second switching circuit, and said third switching circuit.

5. The motor of claim 4, wherein said voltage comparison circuit is a hysteresis comparison circuit.

6. The motor of claim 4, wherein
   the number of poles of each of said starting winding and said first main winding is 4; and
   the number of poles of said second main winding is 6.

7. The motor of claim 6, wherein as said motor operates at low speed, firstly an operating circuit for said 4-pole starting winding, and that for said 4-pole main winding are switched on, said motor is started in a 4-pole starting mode, upon reaching certain speed, said operating circuit for said 4-pole starting winding, and that for said 4-pole main winding are switched off, an operating circuit for said 6-pole main winding is switched on and control said motor to operate.

* * * * *